US010067951B2

(12) United States Patent
Chae et al.

(10) Patent No.: US 10,067,951 B2
(45) Date of Patent: Sep. 4, 2018

(54) METHOD FOR CREATING BINARY CODE AND ELECTRONIC DEVICE THEREOF

(71) Applicant: Samsung Electronics Co., Ltd., Gyeonggi-do (KR)

(72) Inventors: Sang-Won Chae, Seoul (KR); Kavin Kumar Thangadorai, Gyeonggi-do (KR); Jaehan Koh, Seoul (KR); Jung-Eun Lee, Gyeonggi-do (KR)

(73) Assignee: Samsung Electronics Co, Ltd (KR)

( * ) Notice: Subject to any disclaimer, the term of this patent is extended or adjusted under 35 U.S.C. 154(b) by 153 days.

(21) Appl. No.: 14/626,454

(22) Filed: Feb. 19, 2015

(65) Prior Publication Data
US 2015/0234637 A1 Aug. 20, 2015

(30) Foreign Application Priority Data

Feb. 19, 2014 (KR) .................. 10-2014-0019347
Aug. 1, 2014 (KR) .................. 10-2014-0099009

(51) Int. Cl.
*G06F 17/30* (2006.01)
*G06F 9/445* (2018.01)

(52) U.S. Cl.
CPC ........ *G06F 17/30262* (2013.01); *G06F 9/445* (2013.01)

(58) Field of Classification Search
None
See application file for complete search history.

(56) References Cited

U.S. PATENT DOCUMENTS

| 5,138,697 A * | 8/1992 | Yamamoto ............ G06F 17/50 345/420 |
| 2002/0097802 A1* | 7/2002 | Lin .................... H04N 19/197 375/240.23 |
| 2007/0019873 A1* | 1/2007 | Tzannes .................. G06T 9/00 382/239 |
| 2008/0055331 A1* | 3/2008 | Iourcha .................. G06T 9/00 345/582 |
| 2008/0229303 A1* | 9/2008 | Carteri .................. G06F 8/61 717/177 |
| 2009/0295977 A1* | 12/2009 | Sato .................... G06F 3/147 348/333.12 |
| 2011/0032251 A1* | 2/2011 | Pothana ................ G06T 9/00 345/419 |
| 2011/0115806 A1* | 5/2011 | Rogers ................. G06T 9/00 345/582 |

(Continued)

OTHER PUBLICATIONS

Vairagde, Rupali Sachin, and Rekha A. Kulkarni. "Mobile Device Oriented Image Scaling for Reducing Memory Consumption in storing in Android."International Journal of Computer Applications Technology and Research3.1: 84-87, Jan. 2014.*

*Primary Examiner* — Xin Sheng
(74) *Attorney, Agent, or Firm* — The Farrell Law Firm, P.C.

(57) ABSTRACT

A method for creating a binary code in an electronic device is provided, which includes operations of confirming an image resource for an application, based on a request for creating a binary code for the application; determining an attribute for the image resource; selectively converting the image resource into a compressed texture, based on the attribute; and, if the image resource is converted, creating the binary code for the application, based on the converted image resource.

18 Claims, 7 Drawing Sheets

(56) References Cited

U.S. PATENT DOCUMENTS

| | | |
|---|---|---|
| 2013/0033513 A1 | 2/2013 | Rasmusson et al. |
| 2013/0198485 A1* | 8/2013 | Nystad ............... G06F 12/0215 |
| | | 711/204 |
| 2014/0025952 A1* | 1/2014 | Marlow ............. H04L 63/0428 |
| | | 713/168 |

* cited by examiner

METHOD FOR CREATING BINARY CODE AND ELECTRONIC DEVICE THEREOF

PRIORITY

The present application claims priority under 35 U.S.C. § 119(a) to a Korean Patent Application filed in the Korean Intellectual Property Office on Feb. 19, 2014, and assigned Serial No. 10-2014-0019347, and a Korean Patent Application filed in the Korean Intellectual Property Office on Aug. 1, 2014, and assigned Serial No. 10-2014-0099009, the contents of which are incorporated herein by reference.

BACKGROUND OF THE INVENTION

1. Field of the Invention

The present invention generally relates to a technology for converting a resource for binary creation.

2. Description of the Related Art

Electronic devices are developing into multimedia instruments providing various services such as a voice and video call function, an information input/output function, and a data transmission/reception function. When an application is launched in an electronic device, a Central Processing Unit (CPU) changes a general compressed image such as Portable Network Graphics (PNG) and Joint Photographic Experts Group (JPG) among resource files of the application, into a texture compressed image, and forwards the texture compressed image to a Graphic Processing Unit (GPU).

As described above, upon a launch of an application, an electronic device performs every time a process of changing a compressed image among resource files of an application into a texture compressed image, so opening of an application can be delayed.

SUMMARY OF THE INVENTION

The present invention has been made to solve the above-mentioned problems and/or disadvantages and to provide at least the advantages described below. Accordingly, an aspect of the present invention is to provide an apparatus and method for optimizing a resource file of an application, when creating a binary code for the application in an electronic device.

Another aspect of the present invention is to provide an apparatus and method for converting an image file among resource files of an application into a compressed texture when creating a binary code for the application in an electronic device.

Another aspect of the present invention is to provide an apparatus and method for converting an image file among resource files of an application into another image type, when creating a binary code for the application in an electronic device.

According to an aspect of the present invention, a method for creating a binary code in an electronic device is provided, which includes the operations of confirming an image resource for an application, based on a request for creating a binary code for the application; determining an attribute for the image resource; selectively converting the image resource into a compressed texture, based on the attribute; and, if the image resource is converted, creating the binary code for the application, based on the converted image resource.

According to another aspect of the present invention, an electronic device is provided, which includes a processor configured to confirm an image resource for an application, based on a request for creating a binary code for the application, to determine an attribute for the image resource, selectively convert the image resource into a compressed texture, based on the attribute, and to, if the image resource is converted, create the binary code for the application, based on the converted image resource.

According to another aspect of the present invention, a non-transitory computer-readable recording medium storing instructions and recording a program for executing operations is provided. The operations include confirming an image resource for an application, based on a request for creating a binary code for the application, in an electronic device; determining an attribute for the image resource; selectively converting the image resource into a compressed texture, based on the attribute; and if the image resource is converted, creating the binary code for the application, based on the converted image resource.

According to another aspect of the present invention, a method for creating a binary code in an electronic device is provided, which includes upon an installation of an application, confirming an image resource for the application; determining an attribute for the image resource; selectively converting the image resource into a compressed texture, based on the attribute; if the image resource is converted, repackaging an installation package for the application to include the converted image resource; and installing the application using the repackaged installation package for the application.

According to another aspect of the present invention, an electronic device is provided, which includes a processor configured to, upon an installation of an application, confirm an image resource for the application, to determine an attribute for the image resource, to selectively convert the image resource into a compressed texture, based on the attribute, to, if the image resource is converted, repackage an installation package for the application to include the converted image resource, and to install the application using the repackaged installation package for the application.

According to another aspect of the present invention, a non-transitory computer-readable recording medium storing instructions and recording a program for executing operations is provided. The operations include upon an installation of an application, confirming an image resource for the application; determining an attribute for the image resource; selectively converting the image resource into a compressed texture, based on the attribute; if the image resource is converted, repackaging an installation package for the application to include the converted image resource; and installing the application using the repackaged installation package for the application.

BRIEF DESCRIPTION OF THE DRAWINGS

The above and other aspects, features and advantages of the present invention will become more apparent from the following detailed description, when taken in conjunction with the accompanying drawings, in which.

DETAILED DESCRIPTION OF EMBODIMENTS OF THE PRESENT INVENTION

Figure 1:
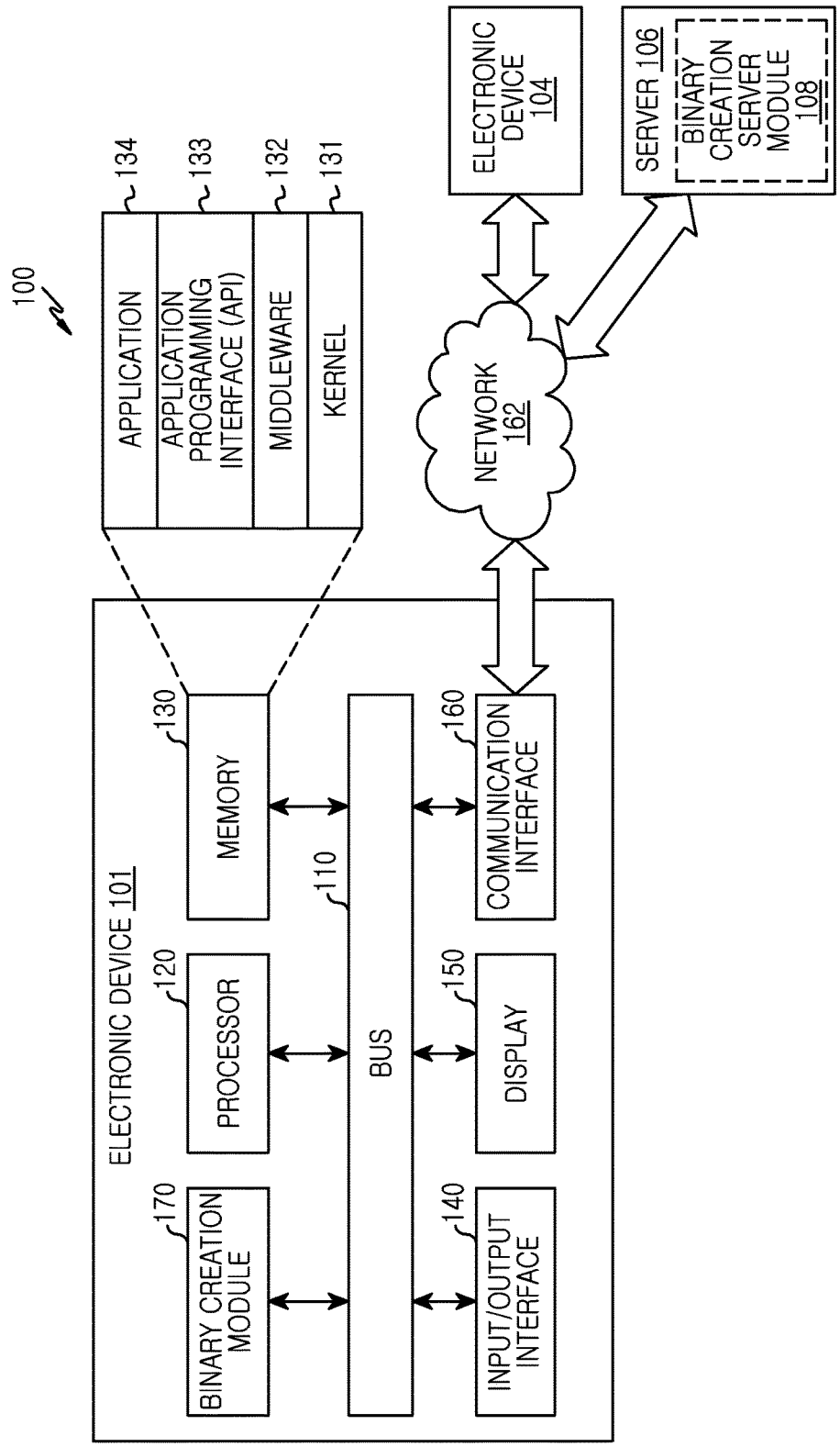
FIG. 1 is a block diagram illustrating a configuration of an electronic device in a network environment according to an embodiment of the present invention.

Various embodiments are stated herein below with reference to the accompanying drawings. The various embodiments can make various modifications and can have various embodiments. So, specific embodiments are illustrated in the drawings and a related detailed description is stated. But these are not intended to limit the various embodiments to a specific embodiment form, and should be understood as including all changes, equivalents or alternatives included in the spirit and technical scope of the various embodiments. In the related description of the drawings, like reference numerals are used for like constituent elements.

The terms such as "comprise", "include", "can include", "can comprise", and the like, used in various embodiments indicate the existence of the corresponding function, operation, constituent element, and the like, and do not limit additional one or more functions, operations, constituent elements, and the like. Also, in the various embodiments, it should be understood that the terms such as "comprise", "include", "have", and the like, are to designate the existence of a feature stated in the specification, such as a number, a step, an operation, a constituent element, a component, or a combination thereof, and do not exclude a possibility of existence or supplement of one or more other features, numbers, steps, operations, constituent elements, components, or combinations thereof.

In various embodiments, the terms such as "or", "at least one of A or/and B", and the like, include any and all combinations of words enumerated together. For example, "A or B" or "at least one of A or/and B" can include "A", or can include "B", or can include all of "A" and "B".

In various embodiments, the terms "1st", "2nd", "first", "second", and the like, can modify various constituent elements of various embodiments, but do not limit the corresponding constituent elements. For example, the terms do not limit the order of the corresponding constituent elements, the importance thereof, and the like. The expressions can be used to distinguish one constituent element from another constituent element. For example, a 1st user device and a 2nd user device both are user devices, and represent different user devices. For example, a 1st constituent element can be named as a 2nd constituent element without departing from the scope of various embodiments. Likely, even a 2nd constituent element can be named as a 1st constituent element.

When any constituent element is described as "connected" or "accessed" to another constituent element, it should be understood that, although any constituent element may be directly connected or accessed to another constituent element, the third constituent element can also exist between the two constituent elements. In contrast, when any constituent element is described as "directly connected" or "directly accessed" to another constituent element, it should be understood that the third constituent element does not exist between the two constituent elements.

The terms used in various embodiments are used for merely describing specific embodiments, and are not intended to limit the various embodiments. The expression of singular number includes the expression of plural number unless the context clearly dictates otherwise.

Unless defined otherwise, all terms used herein including technological or scientific terms have the same meaning as being generally understood by a person having ordinary knowledge in the art to which various embodiments belong. Terms as defined in a general dictionary should be interpreted as having meanings consistent with a contextual meaning of a related technology, and are not interpreted as having ideal or excessively formal meanings unless defined clearly in various embodiments.

An electronic device according to an embodiment of the present invention may include at least one of a smart phone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MPEG Audio Layer 3 (MP3) player, a mobile medical instrument, a camera, and a wearable device (e.g., a Head-Mounted Display (HMD) such as electronic glasses, electronic clothes, an electronic bracelet, an electronic necklace, an appcessory, an electronic tattoo, or a smart watch).

According to an embodiment of the present invention, the electronic device may be a smart home appliance. For example, the smart home appliance may include at least one of a television, a Digital Video Disk (DVD) player, an audio system, a refrigerator, an air conditioner, a cleaner, an oven, a microwave, a washing machine, an air cleaner, a set-top box, a TV box (for example, Samsung HomeSync™, Apple TV™, or Google TV™), a game console, an electronic dictionary, an electronic locking system, a camcorder, and an electronic frame.

According to an embodiment of the present invention, the electronic device may include at least one of a variety of medical instruments (e.g., Magnetic Resonance Angiography (MRA), Magnetic Resonance Imaging (MRI), Computerized Tomography (CT), a scanning machine, an ultrasound machine, and the like), a navigation device, a Global Positioning System (GPS) receiver, an Event Data Recorder (EDR), a Flight Data Recorder (FDR), a car infotainment device, an electronic equipment for ship (e.g., a navigation device for ship, a gyrocompass, and the like), avionics, a security instrument, a head unit for a vehicle, an industrial or household robot, an Automatic Teller's Machine (ATM) of a financial institution, and a Point Of Sales (POS) of a shop.

According to an embodiment of the present invention, the electronic device may include at least one of furniture or part of a building/structure, an electronic board, an electronic signature receiving device, a projector, and various metering instruments (e.g., a tap water, electricity, gas, or radio wave metering instrument, and the like). The electronic device according to an embodiment of the present invention may be one or a combination of the aforementioned various devices. Also, the electronic device according to an embodiment of the present invention may be a flexible device. Further, it is apparent to those skilled in the art that the electronic device according to an embodiment of the present invention is not limited to the aforementioned instruments.

Electronic devices according to an embodiment of the present invention will be described below with reference to the accompanying drawings. The term 'user' used in the various embodiments of the present invention denotes a person who uses an electronic device or a device (e.g., an artificial intelligence electronic device) which uses the electronic device.

FIG. 1 illustrates a network environment 100 including an electronic device 101 according to an embodiment of the present invention.

Referring to FIG. 1A, the electronic device 101 includes a bus 110, a processor 120, a memory 130, an input/output interface 140, a display 150, a communication interface 160, and a binary creation module 170.

The bus 110 is a circuit connecting the aforementioned constituent elements with one another and forwarding communication information (e.g., a control message) among the aforementioned constituent elements.

The processor 120, for example, receives instructions from the aforementioned other constituent elements (e.g., the memory 130, the input/output interface 140, the display 150, the communication interface 160, or the binary creation module 170) through the bus 110, deciphers the received instructions, and executes an operation or data processing according to the deciphered instructions. Though not illustrated, a graphic processor is for solving a bottleneck phenomenon which occurs due to a graphic work of the processor 120. The graphic processor more efficiently processes a 2-Dimensional (2D) or 3-Dimensional (3D) graphic than the processor 120 processes. According to an embodiment of the present invention, if a resource such as PNG/JPEG is converted into a compressed texture in the processor 120, the graphic processor controls to process the compressed texture and display the processed texture through the display 150.

The memory 130 stores an instruction or data which is received from the processor 120 or the other constituent elements (e.g., the input/output interface 140, the display 150, the communication interface 160, or the binary creation module 170), or which is generated by the processor 120 or the other constituent elements. The memory 130, for example, includes programming modules such as a kernel 131, a middleware 132, an Application Programming Interface (API) 133, an application 134, and the like. The aforementioned respective programming modules may be composed of software, firmware, hardware, or a combination of at least two or more of them.

The kernel 131 controls or manages system resources (e.g., the bus 110, the processor 120, the memory 130, and the like) used for executing operations or functions implemented in the remnant other programming modules, for example, the middleware 132, the API 133, and the application 134. Also, the kernel 131 provides an interface of enabling the middleware 132, the API 133, or the application 134, to access and control or manage an individual constituent element of the electronic device 101.

The middleware 132 performs a relay role such that the API 133 or the application 134 can communicate with the kernel 131 and exchange data with the kernel 131. Also, in relation with work requests received from the application 134, the middleware 132, for example, performs control (e.g., scheduling or load balancing) for the work request using a method of allotting the order of priority for using the system resource (e.g., the bus 110, the processor 120, the memory 130 or the like) of the electronic device 101 to at least one application among the applications 134.

The API 133, which is an interface for enabling the application 134 to control a function provided in the kernel 131 or the middleware 132, includes, for example, at least one interface or function (e.g., an instruction) for file control, window control, image processing, character control, or the like.

According to an embodiment of the present invention, the application 134 may include a Short Message Service (SMS)/Multimedia Message Service (MMS) application, an electronic mail (e-mail) application, a calendar application, an alarm application, a health care application (e.g., an application measuring momentum, blood sugar, or the like), environment information application (e.g., an application providing air pressure, humidity, temperature information, or the like), or the like. Further, the application 134 may be an application related with information exchange between the electronic device 101 and an external electronic device (e.g., an electronic device 104). The application related with the information exchange may include, for example, a notification relay application for relaying specific information to the external electronic device, or a device management application for managing the external electronic device.

For example, the notification relay application includes a function of relaying, to the external electronic device (e.g., the electronic device 104), notification information generated in other applications (e.g., the SMS/MMS application, the e-mail application, the health care application, the environment information application, or the like) of the electronic device 101. Further, the notification relay application may, for example, receive the notification information from the external electronic device (e.g., the electronic device 104) and provide the received notification information to a user.

The device management application, for example, manages (e.g., install, remove or update) a function (e.g., turn-on/turn-off of the external electronic device itself (or some constituent components), or adjustment of a brightness or resolution of a display) of at least a part of the external electronic device (e.g., the electronic device 104) communicating with the electronic device 101, an application operating in the external electronic device, or a service (e.g., a call service or a message service) provided in the external electronic device.

According to an embodiment of the present invention, the application 134 includes an application designated in accordance to an attribute (e.g., kind) of the external electronic device (e.g., the electronic device 104). For example, when the external electronic device is an MP3 player, the application 134 includes an application related with music playback. Similarly, when the external electronic device is a mobile medical instrument, the application 134 includes an application related with health care. According to an embodiment of the present invention, the application 134 includes at least one of an application designated to the electronic device 101 and an application received from the external electronic device (e.g., the server 106 or the electronic device 104).

The input/output interface 140 forwards an instruction or data, which is inputted from a user through an input/output device (e.g., a sensor, a keyboard, or a touch screen), for example, to the processor 120, the memory 130, the communication interface 160, or the binary creation module 170 through the bus 110. For example, the input/output interface 140 provides data about a user's touch inputted through the touch screen, to the processor 120. Also, the input/output interface 140, for example, outputs through an input/output device (e.g., a speaker or a display) an instruction or data which is received from the processor 120, the memory 130, the communication interface 160, or the binary creation module 170 through the bus 110. For example, the input/output interface 140 outputs voice data, which is processed through the processor 120, to the user through the speaker.

The display 150 displays various information (e.g., multimedia data, text data, or the like) to a user.

The communication interface 160 connects communication between the electronic device 101 and the external device (e.g., the electronic device 104 or the server 106). For example, the communication interface 160 is connected to a network 162 through wireless communication or wired communication and communicates with the external device. The wireless communication may include, for example, at least one of Wireless Fidelity (WiFi), Bluetooth (BT), Near Field Communication (NFC), Global Positioning System (GPS), and cellular communication (e.g., Long Term Evolution (LTE), LTE—Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like). The wired communication may include, for example, at least one of a Universe Serial Bus (USB), a High Definition Multimedia Interface (HDMI), a Recommended Standard-232 (RS-232), and a Plain Old Telephone System (POTS).

According to an embodiment of the present invention, the network 162 is a telecommunications network. The telecommunications network may include at least one of a computer network, the Internet, the Internet of things, and a telephone network. According to an embodiment of the present invention, a protocol (e.g., a transport layer protocol, a data link layer protocol, or a physical layer protocol) for communication between the electronic device 101 and the external device is supported in at least one of the application 134, the application programming interface 133, the middleware 132, the kernel 131, and the communication interface 160.

According to an embodiment of the present invention, the server 106 supports driving of the electronic device 101 by performing at least one operation among operations (or functions) implemented in the electronic device 101. For example, the server 106 may include a binary creation server module 108 which can support the binary creation module 170 implemented in the electronic device 101. For instance, the binary creation server module 108 may include at least one constituent element of the binary creation module 170, and perform (e.g., act for) at least one operation among operations performed by the binary creation module 170.

According to an embodiment of the present invention, the electronic device 101 receives, from the server 106, a delivery of the whole binary included in the electronic device 101. For example, the server 106 creates a binary, and transmits the created binary to the electronic device 101.

The binary creation module 170 processes at least part of information acquired from the other constituent elements (e.g., the processor 120, the memory 130, the input/output interface 140, the communication interface 160, and the like), and provides this to a user in various methods. For example, the binary creation module 170 controls at least some functions of the electronic device 101 such that the electronic device 101 interworks with other electronic devices (e.g., the electronic device 104 or the server 106), using the processor 120 or independently. According to an embodiment of the present invention, the server 106 (e.g., the binary creation server module 108) may include at least one construction of the binary creation module 170 and support at least one operation implemented in the binary creation module 170. Additional information about the binary creation module 170 is provided through FIG. 2 described below.

Figure 2:
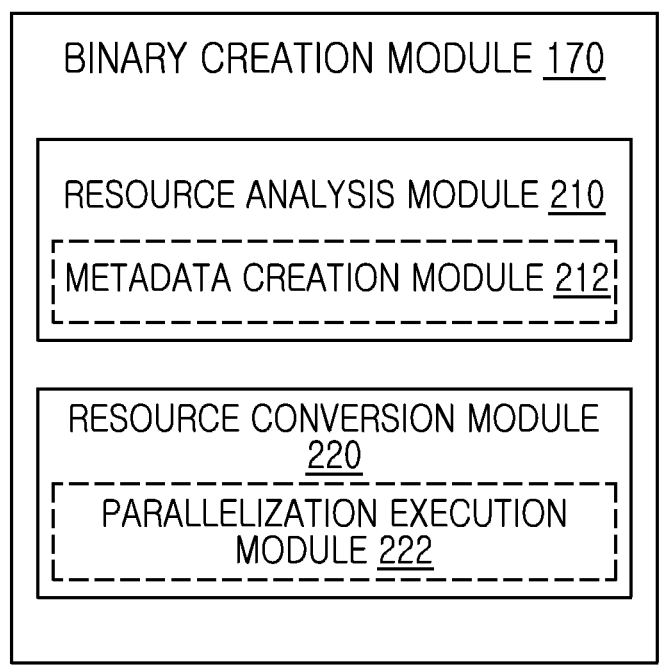
FIG. 2 is a block diagram illustrating a configuration of a binary creation module of an electronic device according to an embodiment of the present invention.

FIG. 2 is a block diagram illustrating a configuration of a binary creation module 170 of an electronic device (e.g., the electronic device 101) according to an embodiment of the present invention.

Referring to FIG. 2, the binary creation module 170 includes a resource analysis module 210, a metadata creation module 212, a resource conversion module 220, and a parallelization execution module 222. According to one embodiment of the present invention, the electronic device may not include at least some of the resource analysis module 210, the metadata creation module 212, the resource conversion module 220, and the parallelization execution module 222.

The binary creation module 170, for example, creates a binary code for an application. For example, the binary creation module 170 performs an installation or build for the application. For instance, the binary creation module 210 performs the build for the application by converting a source code (e.g., a code composed by C/C++, JAVA, Android, and the like) for the application into a binary code, or performs the installation for the application by storing the converted binary code in the memory 130.

For instance, the binary creation module 170 creates a binary including a resource converted by the resource conversion module 220. According to an embodiment of the present invention, the binary creation module 170 creates a binary for an application using a binary creation program stored in the memory 130.

The resource analysis module 210 extracts an image resource among resources of an application. The image resource extracted from the resources of the application may be, for example, a compressed image format such as PNG or JPG, or a predefined compressed texture format (e.g., a texture previously compressed in accordance to a form decided in accordance to a system configuration and the like).

According to an embodiment of the present invention, the resource analysis module 210 determines whether an extracted image resource is a resource convertible into a compressed texture.

According to an embodiment of the present invention, the resource analysis module 210 determines whether an extracted image resource is a resource capable of executing parallelization through a graphic processor. According to an embodiment of the present invention, the resource analysis module 210 may include the metadata creation module 212 for storing, as metadata, parallelization execution information which is based on a consumption current of the electronic device 101, a heat emission thereof, and a characteristic of the graphic processor. According to an embodiment of the present invention, the characteristic of the graphic processor may include at least one of the number of cores, a memory, a processable data type, the number of threads executable in the core, a power, a clock, a consumption current, and a heat emission. According to an embodiment of the present invention, the resource analysis module 210 confirms a characteristic of a graphic processor of each terminal such that parallelization can be executed in different graphic processors. According to an embodiment of the present invention, the parallelization execution information may include a parameter (i.e., a work group thread, a work item, and a bandwidth) for controlling the graphic processor to perform the parallelization by using only some cores among a plurality of cores included in the graphic processor or to perform the parallelization by controlling clocks of the cores.

The resource conversion module 220 converts a resource of an application, for example, based on that a binary for the application is created. The application may include a plurality of source codes and resources. The source code defines an operation of a program, and the resource may include information of an audio, a video, an image, a text, and the like, used in the application. For instance, when the installation or build for the application is executed by the binary creation module 170, the resource conversion module 220 acquires the resource of the application from the resource analysis module 210 and converts the acquired resource into a format (e.g., a format optimized to a system, i.e., a format decided in accordance to a system configuration or specifications) corresponding to a system (e.g., the electronic device 101, the electronic device 104, or the server 106). According to an embodiment of the present invention, the resource conversion module 220 converts the resource of the application by using a resource conversion program stored in the memory 130.

According to an embodiment of the present invention, when an extracted resource is a resource convertible into a compressed texture, the resource conversion module 220 converts the extracted resource into the compressed texture.

For example, when a resource is a compressed image, the resource conversion module 220 decodes and converts the compressed image into a bitmap image, and converts the bitmap image into a compressed texture. That is, the resource conversion module 220 converts the compressed image into a compressed texture supportable in the graphic processor.

For example, when a resource is a predefined compressed texture, the resource conversion module 220 converts the resource into the compressed texture supportable in the graphic processor. Also, when the resource is not a resource convertible into the compressed texture supportable in the graphic processor, the resource conversion module 220 converts the resource into another resource type.

According to an embodiment of the present invention, the resource conversion module 220 may include the parallelization execution module 222 and convert a resource into another resource type through parallelization by using only some cores among a plurality of cores included in the graphic processor. According to an embodiment of the present invention, the parallelization execution module 222 converts the resource into another resource type through the parallelization by controlling clocks of the plurality of cores included in the graphic processor.

According to an embodiment of the present invention, an electronic device may be an electronic device including a processor for controlling to confirm an image resource for an application, based on a request for creating a binary code for the application, to determine an attribute for the image resource, to selectively convert the image resource into a compressed texture, based on the attribute, and, if the image resource is converted, to create the binary code for the application, based on the converted image resource.

According to an embodiment of the present invention, the processor may be an electronic device converting the image resource based on setting of an external electronic device capable of communicating with the electronic device.

According to an embodiment of the present invention, the processor may be an electronic device deciding whether to convert the image resource, based on the comparison result between a memory usage when creating the binary code for the application based on the converted image resource and a memory usage when creating a binary code for the application based on an image resource that is not converted.

According to an embodiment of the present invention, the processor may be an electronic device deciding whether to convert the image resource, based on the comparison result between an application driving consumption time when creating the binary code for the application based on the converted image resource and an application driving consumption time when creating a binary code for the application based on an image resource that is not converted.

According to an embodiment of the present invention, the processor may be an electronic device transmitting the created binary code to an external electronic device capable of communicating with the electronic device.

According to an embodiment of the present invention, the processor may be an electronic device converting the image resource into an image resource being based on another codec, which is different from a codec of the image resource that is convertible to a compressed texture, based on the attribute.

According to an embodiment of the present invention, the processor may be an electronic device converting the image resource based on at least one of an encoding consumption time for the image resource, a decoding consumption time for the image resource, and a memory usage for the image resource.

According to an embodiment of the present invention, the processor may be an electronic device determining whether the image resource is in a compressed image format or a predefined compressed texture format.

According to an embodiment of the present invention, the processor may be an electronic device deciding parallelization execution information based on at least one of a consumption current of the electronic device, a heat emission thereof, a characteristic of a graphic processor, and the attribute for the image resource, and selectively converting the image resource into the compressed texture, based on the parallelization execution information.

According to another embodiment of the present invention, an electronic device may be an electronic device including a processor controlling, upon an application installation, to confirm an image resource included in the application, to determine an attribute for the image resource, to selectively convert the image resource into a compressed texture, based on the attribute, if the image resource is converted, to repackage an installation package for the application to include the converted image resource, and to install the repackaged installation package for the application.

According to another embodiment of the present invention, the processor may be an electronic device converting the image resource, based on setting of the electronic device.

According to another embodiment of the present invention, the processor may be an electronic device deciding whether to convert the image resource, based on the comparison result between a memory usage when creating the binary code for the application based on the converted image resource and a memory usage when creating a binary code for the application based on an image resource that is not converted.

According to another embodiment of the present invention, the processor may be an electronic device deciding whether to convert the image resource, based on the comparison result between an application driving consumption time when creating the binary code for the application based on the converted image resource and an application driving consumption time when creating a binary code for the application based on an image resource that is not converted.

According to another embodiment of the present invention, the processor may be an electronic device converting the image resource into an image resource being based on another codec, which is different from a codec of the image resource that is convertible to a compressed texture, based on the attribute.

According to another embodiment of the present invention, the processor may be an electronic device converting the image resource based on at least one of an encoding consumption time for the image resource, a decoding consumption time for the image resource, and a memory usage for the image resource.

According to another embodiment of the present invention, the processor may be an electronic device determining whether the image resource is in a compressed image format or a predefined compressed texture format.

According to another embodiment of the present invention, the processor may be an electronic device deciding parallelization execution information based on at least one of a consumption current of the electronic device, a heat emission thereof, a characteristic of a graphic processor, and the attribute for the image resource, and selectively converting the image resource into the compressed texture, based on the parallelization execution information.

Figure 3:
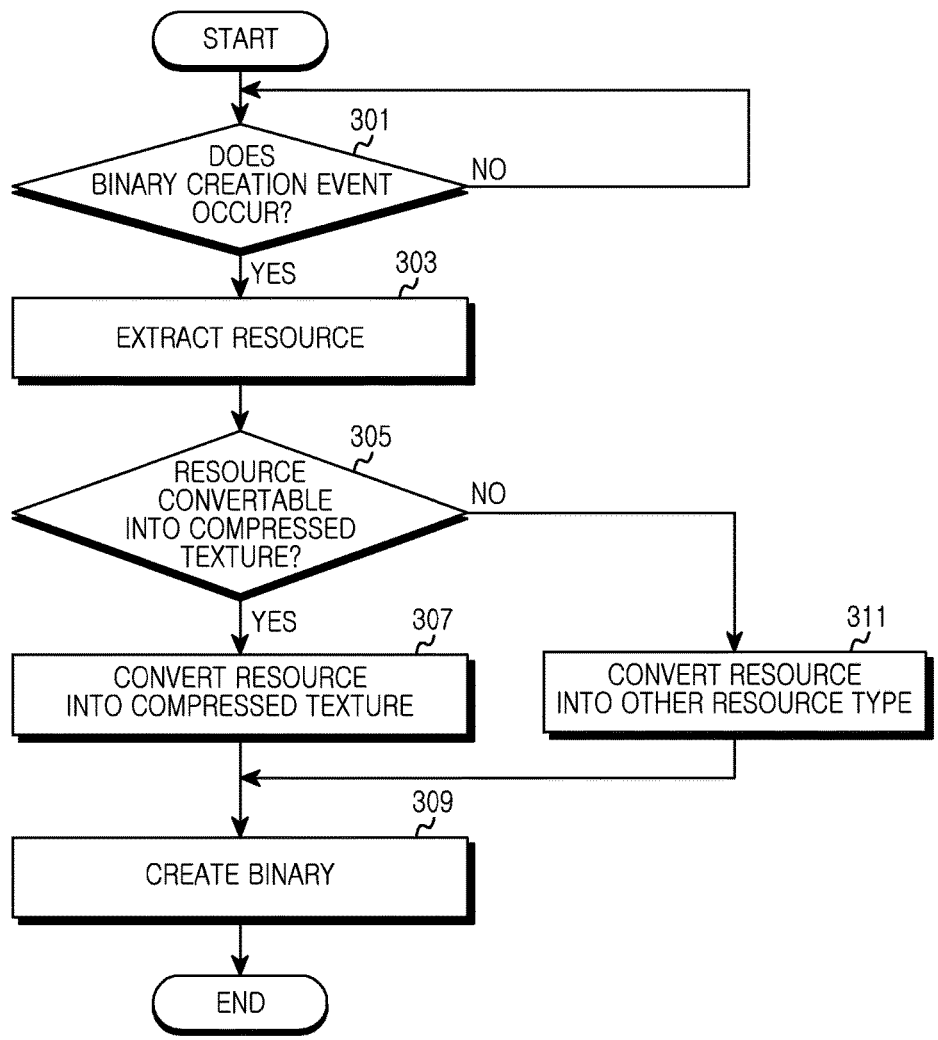
FIG. 3 is a flowchart illustrating a procedure for controlling binary creation in an electronic device according to an embodiment of the present invention.

FIG. 3 illustrates a procedure for controlling binary creation in an electronic device according to an embodiment of the present invention.

Referring to FIG. 3, in step 301, the electronic device determines whether a binary creation event occurs. For example, the electronic device determines whether an installation event for an application occurs. As another example, the electronic device determines whether a build event for an application occurs.

If the binary creation event occurs, in step 303, the electronic device extracts a resource for binary creation. For example, the electronic device extracts an image resource among resources of an application. The extracted image resource may be either in a compressed image format such as PNG and JPG or be in a predefined compressed texture format.

In step 305, the electronic device determines whether the extracted resource is a resource convertible into a compressed texture. For example, the electronic device determines if it is an image convertible into a compressed texture, based on the comparison result between a reference value and a value measuring a quality of an image for extracted image resources using at least one or more of various methods such as Peak Signal-to-Noise Ratio (PSNR) and Modified Structural Similarity (MSSIM). As another example, the electronic device determines whether an image resource included in a list of image resources that are convertible into a compressed texture exists among the extracted image resources.

If the extracted resource is the resource convertible into the compressed texture, the electronic device converts the extracted resource into the compressed texture in step 307. For example, if the resource is in a compressed image such as PNG and JPEG, the electronic device decodes and converts the compressed image into a bitmap image, and converts the bitmap image into the compressed texture. At this time, the electronic device converts the compressed image into a compressed texture supportable in a graphic processor (i.e., a GPU). As another example, if the resource is a predefined compressed texture, the electronic device converts the resource into the compressed texture supportable in the graphic processor.

If the extracted resource is not the resource convertible into the compressed texture, the electronic device converts the resource into another resource type in step 311. For example, the electronic device keeps a picture quality for an image resource, while performing conversion using an image codec capable of reducing an encoding consumption time, a decoding consumption time, and a memory usage.

After converting the resource into the compressed texture or another resource type, the electronic device can create a binary in step 309. For example, the electronic device completes the installation or build of the application, based on the converted resource.

Figure 4:
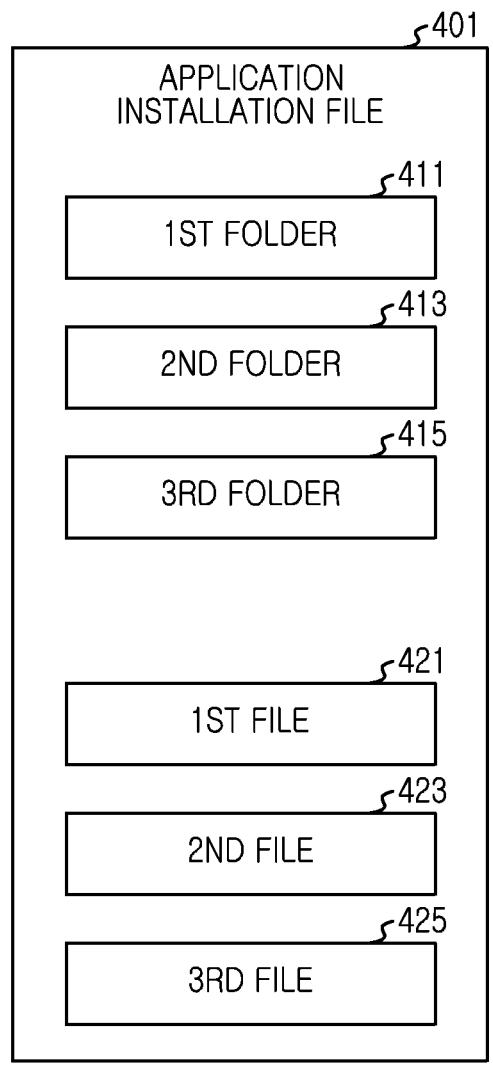
FIG. 4 is a diagram illustrating an example of an application installation file according to an embodiment of the present invention.

FIG. 4 is a diagram illustrating an example of an application installation file according to an embodiment of the present invention.

Referring to FIG. 4, the application installation file 401 includes one or more folders such as a $1^{st}$ folder 411, a $2^{nd}$ folder 413, and a $3^{rd}$ folder 415, and one or more files such as a $1^{st}$ file 421, a $2^{nd}$ file 423, and a $3^{rd}$ file 425. Here, the application installation file 401 is an Application Package (APK) file of the Android operating system.

The $1^{st}$ folder 411 is a folder storing data about an external resource of an application, or a software program. For example, the $1^{st}$ folder 411 may be an "assets" folder of the APK file of the Android operating system.

The $2^{nd}$ folder 413 stores meta information data of the application itself. The meta information data of the application itself includes content for which a user implements a digital signature through a certificate of authentication at the time of distribution of the application. For example, the $2^{nd}$ folder 413 may be an "META_INF" folder of the APK file of the Android operating system.

The $3^{rd}$ folder 415 is a folder storing data about an internal resource of the application, or a software program. For example, the $3^{rd}$ folder 415 may be a "res" folder of the APK file of the Android operating system. According to an embodiment of the present invention, the $3^{rd}$ folder 415 may include an image resource file.

According to an embodiment of the present invention, as illustrated in FIG. 4, the image resource file is located in the $3^{rd}$ folder 415 of the application installation file 401. However, the image resource file may be located in another folder of the application installation file 401 or another location thereof.

The $1^{st}$ file 421 is a file storing basic setup information of the application, and may be a file first referred to among a plurality of files constructing the application. For example, the $1^{st}$ file 421 may be "AndroidManifest.xml" of the Android operating system. According to an embodiment of the present invention, a list of image resources that are convertible into a compressed texture among image resources can be included in the $1^{st}$ file 421.

According to an embodiment of the present invention, as illustrated in FIG. 4, the list of image resources that are convertible into the compressed texture among the image resources is included in the $1^{st}$ file 421 of the application installation file 401. However, the list convertible into the compressed texture among the image resources may be included in another file of the application installation file 401.

The $2^{nd}$ file 423 is a file generated by compiling a source code of the application, and may include information of classes constructing an operation of the application. For example, the $2^{nd}$ file 423 may be "classes.dex" of the Android operating system.

The 3rd file 425 may include resources previously compiled before the launch of the application. For example, the 3rd file 425 may be "resources.arsc" of the Android operating system.

In the aforementioned embodiment of the present invention, the electronic device converts an image resource, based on a request for creating a binary code of an application.

In another embodiment of the present invention, the electronic device may convert the image resource upon application installation.

Figure 5:
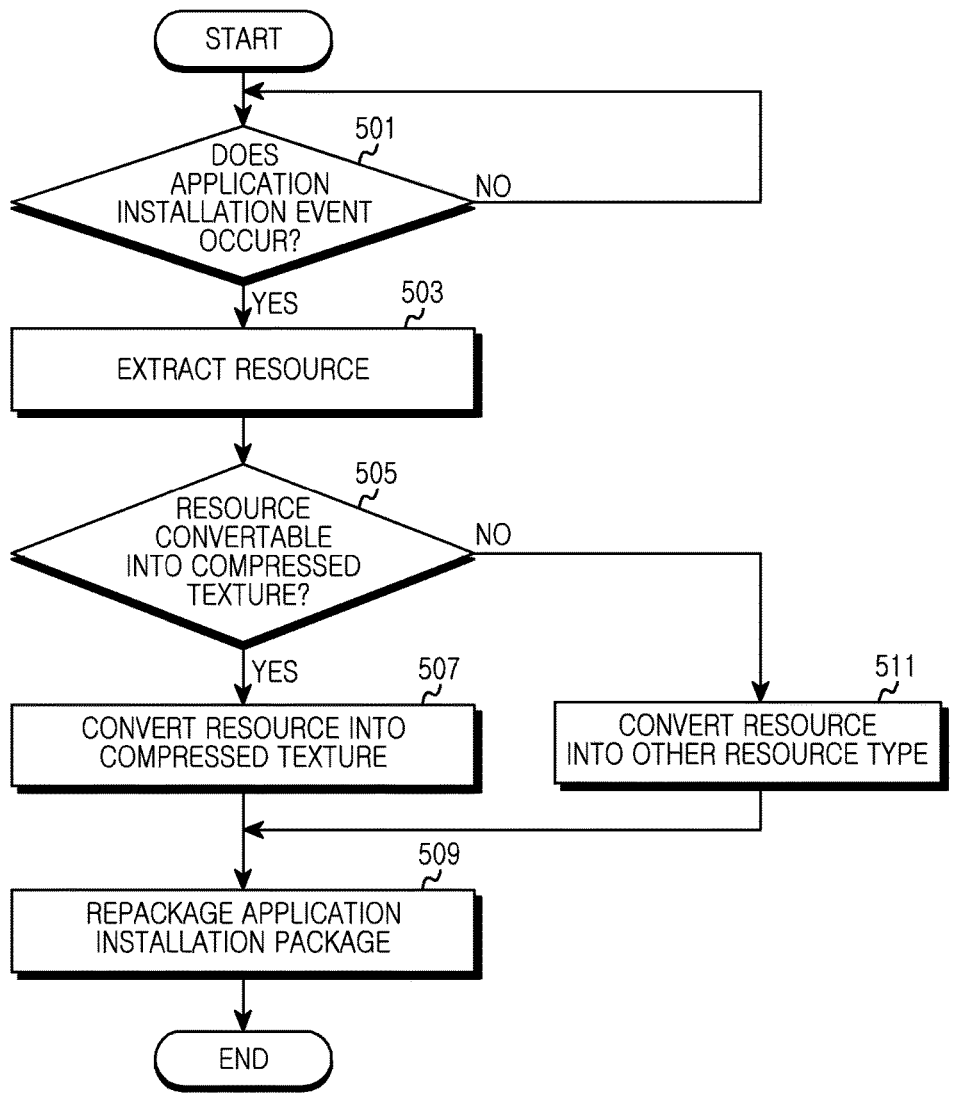
FIG. 5 is a flowchart illustrating a procedure for converting an image resource upon an application installation in an electronic device according to an embodiment of the present invention.

FIG. 5 illustrates a procedure for converting an image resource upon an application installation in an electronic device according to an embodiment of the present invention.

Referring to FIG. 5, in step 501, the electronic device determines whether an application installation event occurs. According to an embodiment of the present invention, the Android system installs an APK file being an application installation package using a package manager or a package installer. According to an embodiment of the present invention, the electronic device determines if an installation event for the application installation package stored in a server or a memory occurs.

If the application installation event occurs, the electronic device extracts a resource included in the application installation package in step 503. According to an embodiment of the present invention, the electronic device extracts an image resource among resources included in the application installation package. The extracted image resource may be either in a compressed image format such as PNG and JPG or be in a predefined compressed texture format.

In step 505, the electronic device determines whether the image resource included in the application installation package is a resource convertible into a compressed texture. According to an embodiment of the present invention, the electronic device determines if it is an image convertible into a compressed texture, based on the comparison result between a reference value and a value measuring a quality of an image for extracted image resources using at least one or more of various methods such as PSNR and MSSIM. According to an embodiment of the present invention, the electronic device determines whether an image resource included in a list of image resources that are convertible into a compressed texture exists among the extracted image resources.

If the image resource included in the application installation package is the resource convertible into the compressed texture, the electronic device converts the image resource included in the application installation file, into the compressed texture in step 507. According to an embodiment of the present invention, if the image resource included in the application installation file is a compressed image such as PNG and JPEG, the electronic device decodes and converts the compressed image into a bitmap image, and converts the bitmap image into the compressed texture. According to an embodiment of the present invention, the electronic device converts the compressed image into a compressed texture supportable in a graphic processor (i.e., a GPU). According to an embodiment of the present invention, if the image resource included in the application installation package is a predefined compressed texture, the electronic device converts the image resource into the compressed texture supportable in the graphic processor.

If the image resource included in the application installation package is not the resource convertible into the compressed texture, the electronic device converts the image resource included in the application installation package, into another resource type in step 511. According to an embodiment of the present invention, the electronic device keeps a picture quality for the image resource included in the application installation package, while performing conversion using an image codec capable of reducing an encoding consumption time, a decoding consumption time, and a memory usage.

After converting the image resource included in the application installation package into the compressed texture or another resource type, the electronic device repackages the application installation package to include the converted resource in step 509. According to an embodiment of the present invention, the electronic device completes the installation of the application using the repackaged application installation package.

According to an embodiment of the present invention, after application installation, the electronic device converts a resource and repackages an application installation package, based on a reference condition.

According to an embodiment of the present invention, when being in charging, the electronic device converts a resource of an installed application and repackages an application installation package.

According to an embodiment of the present invention, when being operating in a sleep mode during a predetermined time, the electronic device converts a resource of an installed application and repackages an application installation package.

Figure 6:
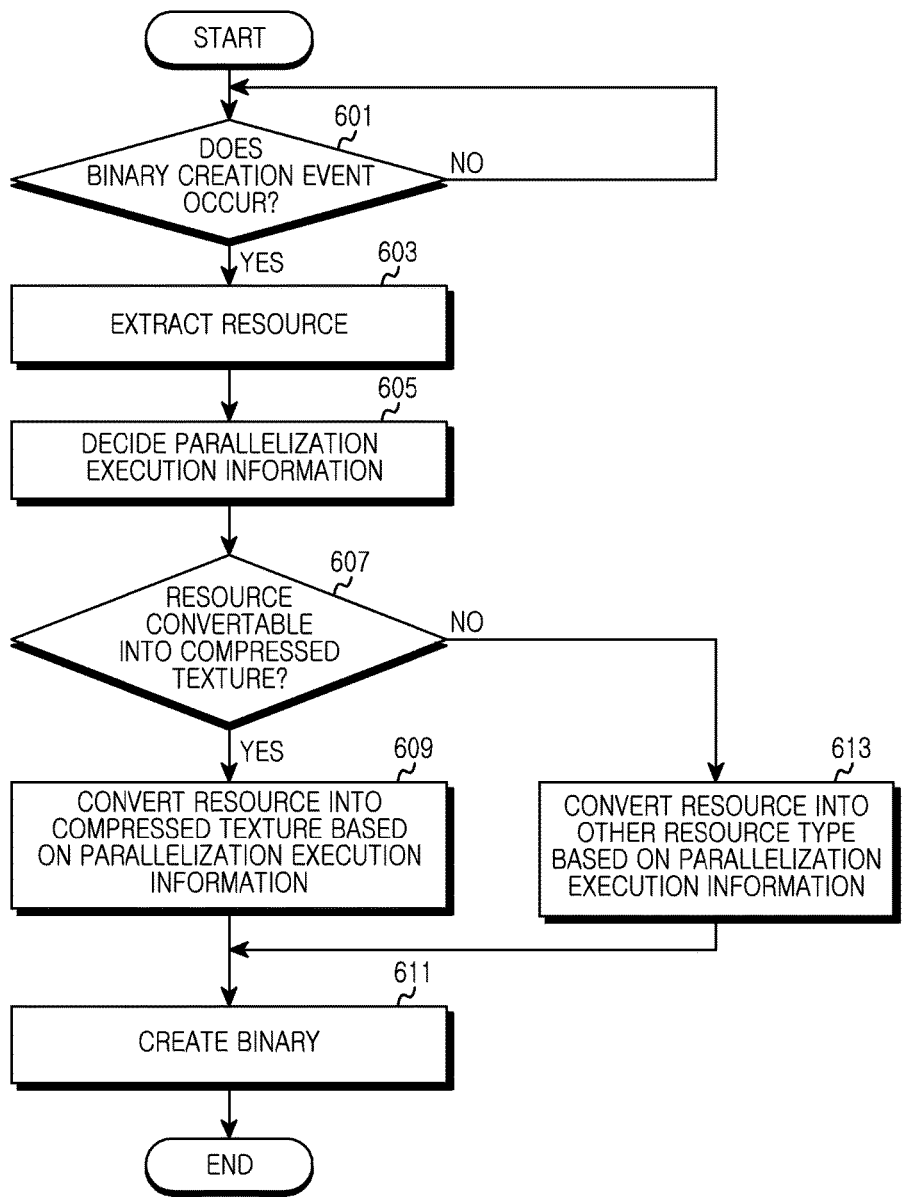
FIG. 6 is a flowchart illustrating a procedure for controlling binary creation in an electronic device according to an embodiment of the present invention.

FIG. 6 illustrates a procedure for controlling binary creation in an electronic device according to an embodiment of the present invention.

Referring to FIG. 6, in step 601, the electronic device determines whether a binary creation event occurs. For example, the electronic device determines whether an installation event for an application occurs. As another example, the electronic device determines whether a build event for an application occurs.

If the binary creation event occurs, the electronic device extracts a resource for binary creation in step 603. For example, the electronic device extracts an image resource among resources of an application. The extracted image resource may be either in a compressed image format such as PNG and JPG or be in a predefined compressed texture format.

In step 605, the electronic device decides parallelization execution information. According to an embodiment of the present invention, the electronic device stores, as metadata, parallelization execution information which is based on a consumption current of the electronic device, a heat emission thereof, and a characteristic of a graphic processor. According to an embodiment of the present invention, the electronic device confirms a characteristic of a graphic processor of each terminal such that parallelization can be executed in different graphic processors. According to an embodiment of the present invention, the characteristic of the graphic processor may include at least one of the number of cores, a memory, a processable data type, the number of threads executable in the core, a power, a clock, a consumption current, and a heat emission. According to an embodiment of the present invention, the parallelization execution information may include step information which is parallelizable in a resource conversion process (or codec) based on the type of the extracted resource.

In step 607, the electronic device determines whether the extracted resource is a resource convertible into a compressed texture. For example, the electronic device determines if it is an image convertible into a compressed texture, based on the comparison result between a reference value and a value measuring a quality of an image for extracted image resources using at least one or more of various methods such as PSNR and MSSIM. As another example, the electronic device determines whether an image resource included in a list of image resources that are convertible into a compressed texture exists among the extracted image resources.

If the extracted resource is the resource convertible into the compressed texture, the electronic device converts the extracted resource into the compressed texture in step 609. For example, if the resource is a compressed image such as PNG and JPEG, the electronic device decodes and converts the compressed image into a bitmap image, and converts the bitmap image into the compressed texture. At this time, the electronic device converts the compressed image into a compressed texture supportable in a graphic processor (i.e., a GPU). As another example, if the resource is a predefined compressed texture, the electronic device converts the resource into the compressed texture supportable in the graphic processor. According to an embodiment of the present invention, the electronic device converts a resource into a compressed texture through parallelization by using only some cores among a plurality of cores included in the graphic processor. According to an embodiment of the present invention, the electronic device converts the resource into the compressed texture through the parallelization by controlling clocks of the plurality of cores included in the graphic processor.

If the extracted resource is not the resource convertible into the compressed texture, the electronic device converts the resource into another resource type based on the parallelization execution information in step 613. For example, the electronic device keeps a picture quality for an image resource, while performing conversion using an image codec capable of reducing an encoding consumption time, a decoding consumption time, and a memory usage. According to an embodiment of the present invention, the electronic device converts a resource into another resource type through parallelization by using only some cores among a plurality of cores included in a graphic processor. According to an embodiment of the present invention, the electronic device converts the resource into another resource type through the parallelization by controlling clocks of the plurality of cores included in the graphic processor.

After converting the resource into the compressed texture or another resource type, the electronic device can create a binary in step 611. For example, the electronic device completes the installation or build of the application, based on the converted resource.

Figure 7:
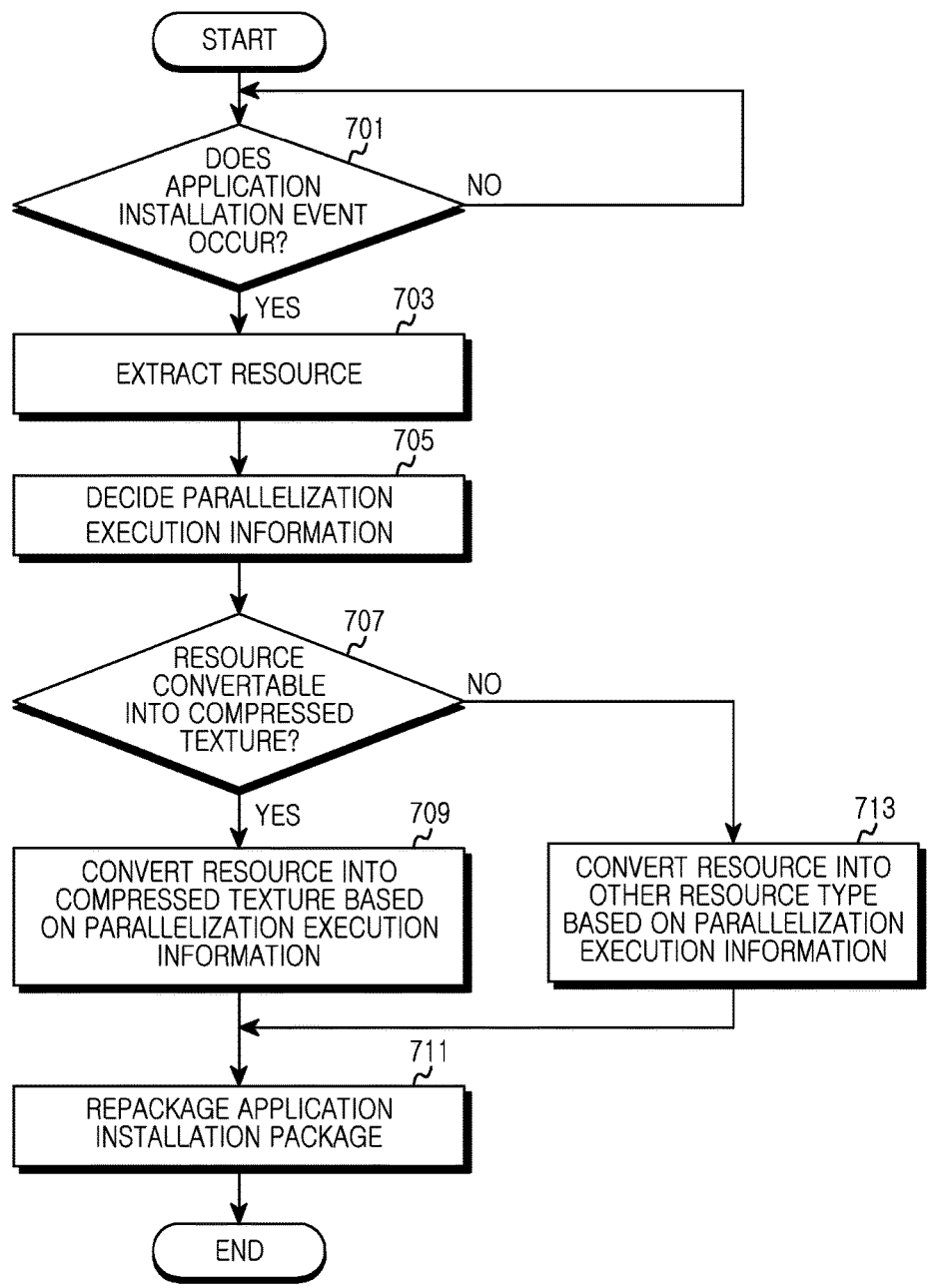
FIG. 7 is a flowchart illustrating a procedure for converting an image resource upon an application installation in an electronic device according to an embodiment of the present invention.

FIG. 7 is a flowchart illustrating a procedure for converting an image resource upon an application installation in an electronic device according to an embodiment of the present invention.

Referring to FIG. 7, in step 701, the electronic device determines whether an application installation event occurs. According to an embodiment of the present invention, the Android system installs an APK file being an application installation package using a package manager or a package installer. According to an embodiment of the present invention, the electronic device determines if an installation event for the application installation package stored in a server or a memory occurs.

If the application installation event occurs, the electronic device extracts a resource included in the application installation package in step 703. According to an embodiment of the present invention, the electronic device extracts an image resource among resources included in the application installation package. The extracted image resource may be either in a compressed image format such as PNG and JPG or be in a predefined compressed texture format.

In step 705, the electronic device decides parallelization execution information. According to an embodiment of the present invention, the electronic device stores, as metadata, parallelization execution information which is based on a consumption current of the electronic device, a heat emission thereof, and a characteristic of a graphic processor. According to an embodiment of the present invention, the electronic device confirms a characteristic of a graphic processor of each terminal such that parallelization can be executed in different graphic processors. According to an embodiment of the present invention, the characteristic of the graphic processor may include at least one of the number of cores, a memory, a processable data type, the number of threads executable in the core, a power, a clock, a consumption current, and a heat emission. According to an embodiment of the present invention, the parallelization execution information may include step information which is parallelizable in a resource conversion process (or codec) based on the type of the extracted resource.

In step 707, the electronic device determines whether the image resource included in the application installation package is a resource convertible into a compressed texture. According to an embodiment of the present invention, the electronic device determines if it is an image convertible into a compressed texture, based on the comparison result between a reference value and a value measuring a quality of an image for extracted image resources using at least one or more of various methods such as PSNR and MSSIM. According to an embodiment of the present invention, the electronic device determines whether an image resource included in a list convertible into a compressed texture exists among the extracted image resources.

If the image resource included in the application installation package is the resource convertible into the compressed texture, the electronic device converts the image resource included in the application installation file, into the compressed texture in step 709. According to an embodiment of the present invention, if the image resource included in the application installation file is a compressed image such as PNG and JPEG, the electronic device decodes and converts the compressed image into a bitmap image, and converts the bitmap image into the compressed texture. According to an embodiment, the electronic device converts the compressed image into a compressed texture supportable in a graphic processor (i.e., a GPU). According to an embodiment of the present invention, if the image resource included in the application installation package is a predefined compressed texture, the electronic device converts the image resource into the compressed texture supportable in the graphic processor. According to an embodiment of the present invention, the electronic device converts a resource into a compressed texture through parallelization by using only some cores among a plurality of cores included in the graphic processor. According to an embodiment of the present invention, the electronic device converts the resource into the compressed texture through the parallelization by controlling clocks of the plurality of cores included in the graphic processor.

If the image resource included in the application installation package is not the resource convertible into the compressed texture, the electronic device converts the image resource included in the application installation package, into another resource type in step 713. According to an embodiment of the present invention, the electronic device keeps a picture quality for the image resource included in the application installation package, while performing conversion using an image codec capable of reducing an encoding consumption time, a decoding consumption time, and a memory usage. According to an embodiment of the present invention, the electronic device converts a resource into another resource type through parallelization by using only some cores among a plurality of cores included in a graphic processor. According to an embodiment of the present invention, the electronic device converts the resource into another resource type through the parallelization by controlling clocks of the plurality of cores included in the graphic processor.

After converting the image resource included in the application installation package into the compressed texture or another resource type, the electronic device repackages the application installation package to include the converted resource in step 711. According to an embodiment of the present invention, the electronic device completes the installation of the application using the repackaged application installation package.

According to an embodiment of the present invention, after application installation, the electronic device converts a resource and repackages an application installation package, based on a reference condition.

According to an embodiment of the present invention, when being in charging, the electronic device converts a resource of an installed application and repackages an application installation package.

According to an embodiment, when being operating in a sleep mode during a predetermined time, the electronic device converts a resource of an installed application and repackages an application installation package.

According to an embodiment of the present invention, a method for creating a binary in an electronic device can include the operations of confirming an image resource for an application, based on a request for creating a binary code for the application, determining an attribute for the image resource, selectively converting the image resource into a compressed texture, based on the attribute, and, if the image resource is converted, creating the binary code for the application, based on the converted image resource.

According to an embodiment of the present invention, the operation of selectively converting can include the operation of converting the image resource based on setting of an external electronic device capable of communicating with the electronic device.

According to an embodiment of the present invention, the method can further include the operation of deciding whether to convert the image resource, based on the comparison result between a memory usage of when creating the binary code for the application based on the converted image resource and a memory usage of when creating a binary code for the application based on the image resource that is not converted.

According to an embodiment of the present invention, the method can further include the operation of deciding whether to convert the image resource, based on the comparison result between an application driving consumption time when creating the binary code for the application based on the converted image resource and an application driving consumption time when creating a binary code for the application based on an image resource that is not converted.

According to an embodiment of the present invention, the method can further include the operation of transmitting the created binary code to an external electronic device capable of communicating with the electronic device.

According to an embodiment of the present invention, the method can further include the operation of converting the image resource into an image resource being based on another codec, which is different from a codec of the image resource that is convertible to a compressed texture, based on the attribute.

According to an embodiment of the present invention, the operation of selectively converting can include the operation of converting the image resource based on at least one of an encoding consumption time for the image resource, a decoding consumption time for the image resource, and a memory usage for the image resource.

According to an embodiment of the present invention, the operation of determining the attribute for the image resource can include the operation of determining whether the image resource is in a compressed image format or a predefined compressed texture format.

According to an embodiment of the present invention, the method can further include the operation of deciding parallelization execution information based on a consumption current of the electronic device, a heat emission thereof, a characteristic of a graphic processor, and the attribute for the image resource. The parallelization execution information comprises step information which is parallelizable in selectively converting the image resource into the compressed texture. The operation of selectively converting the image resource into the compressed texture comprises the operation of selectively converting the image resource into the compressed texture, based on the parallelization execution information.

According to another embodiment of the present invention, a method for creating a binary according to application installation in an electronic device can include the operations of, upon installation of an application, confirming an image resource included in the application, determining an attribute for the image resource, selectively converting the image resource into a compressed texture, based on the attribute, if the image resource is converted, repackaging an installation package for the application to include the converted image resource, and installing the application using the repackaged installation package for the application.

According to another embodiment of the present invention, the operation of selectively converting can include the operation of converting the image resource, based on setting of the electronic device.

According to another embodiment of the present invention, the method can further include the operation of deciding whether to convert the image resource, based on the comparison result between a memory usage when creating the binary code for the application based on the converted image resource and a memory usage when creating a binary code for the application based on an image resource that is not converted.

According to another embodiment of the present invention, the method can further include the operation of deciding whether to convert the image resource, based on the comparison result between an application driving consumption time when creating the binary code for the application based on the converted image resource and an application driving consumption time when creating a binary code for the application based on an image resource that is not converted.

According to another embodiment of the present invention, the method can include the operation of converting the image resource into an image resource being based on another codec, which is different from a codec of the image resource that is convertible to a compressed texture, based on the attribute.

According to another embodiment of the present invention, the operation of determining the attribute for the image resource can include the operation of determining whether the image resource is in a compressed image format or a predefined compressed texture format.

According to another embodiment of the present invention, the operation of selectively converting can include the operation of converting the image resource based on at least one of an encoding consumption time for the image resource, a decoding consumption time for the image resource, and a memory usage for the image resource.

According to another embodiment of the present invention, the method can further include the operation of deciding parallelization execution information based on a consumption current of the electronic device, a heat emission thereof, a characteristic of a graphic processor, and the attribute for the image resource. The parallelization execution information comprises step information which is parallelizable in selectively converting the image resource into the compressed texture. The operation of selectively converting the image resource into the compressed texture comprises the operation of selectively converting the image resource into the compressed texture, based on the parallelization execution information.

As described above, embodiments of the present invention can decrease an application launch time and decrease a memory usage occupied by a resource file, by converting an image file among resource files of an application into a compressed texture or another image type at the time of creating a binary for the application in an electronic device.

Methods according to embodiments stated in claims and/or specification can be implemented in a form of hardware, software, or a combination of hardware and software.

When the methods are implemented by the software, a computer-readable storage medium storing one or more programs (i.e., software modules) can be provided. The one or more programs stored in the computer-readable storage medium are configured to be executed by one or more processors within an electronic device. The one or more programs can include instructions for enabling the electronic device to execute the methods according to the embodiments stated in the claims and/or specification.

These programs (i.e., software modules, software) can be stored in a Random Access Memory (RAM), a nonvolatile memory including a flash memory, a Read Only Memory (ROM), an Electrically Erasable Programmable ROM (EEPROM), a magnetic disk storage device, a Compact Disk ROM (CD-ROM), a Digital Versatile Disk (DVD) or an optical storage device of other forms, and a magnetic cassette. Alternatively, the programs can be stored in a memory constructed by a combination of some or all of them. Also, each constructed memory may be included in plural.

The programs can be stored in an attachable storage device accessible to the electronic device through a communication network such as the Internet, an intranet, a Local Area Network (LAN), a Wireless LAN (WLAN) and a Storage Area Network (SAN), or a communication network constructed by a combination of them. This storage device can access the electronic device through an external port.

A separate storage device on the communication network may also access a portable electronic device.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for operating an electronic device, the method comprising:
   determining, by at least one processor of the electronic device, whether the electronic device operates in a sleep mode;
   in response to determining that the electronic device operates in the sleep mode, identifying, by the at least one processor, an image resource with a first format for an application stored in a memory of the electronic device, based on receiving a request for creating a binary code for the application;
   converting, by the at least one processor, the image resource into a compressed texture;
   determining, by the at least one processor, whether to use the compressed texture to create a binary code for the application based on a quality of the compressed texture;
   in response to determining to use the compressed texture, repackaging, by the at least one processor, an installation package for the application to include the compressed texture such that the application is installed based on the installation package repackaged to include the compressed texture; and
   in response to determining not to use the compressed texture, converting, by the at least one processor, a format of the image resource from the first format to a second format and repackaging, by the at least one processor, an installation package for the application to include the image resource with the second format such that the application is installed based on the installation package repackaged to include the image resource with the second format.

2. The method of claim 1, wherein converting the image resource into the compressed texture by the at least one processor comprises converting, by the at least one processor, the image resource into the compressed texture based on a setting of an external electronic device capable of communicating with the electronic device.

3. The method of claim 1, further comprising determining, by the at least one processor, whether to use the compressed texture to create the binary code for the application, based on a comparison result between a memory usage when creating the binary code for the application by using the compressed texture and a memory usage when creating the binary code for the application based on the image resource.

4. The method of claim 1, further comprising determining, by the at least one processor, whether to use the compressed texture to create the binary code for the application, based on a comparison result between an application driving consumption time when creating the binary code for the application by using the compressed texture and an application driving consumption time of when creating the binary code for the application based on the image resource.

5. The method of claim 1, wherein converting the format of the image resource by the at least one processor comprises, in response to determining not to use the compressed texture, converting, by the at least one processor, the format of the image resource such that the quality of the image resource is substantially maintained based on at least one of an encoding consumption time for the image resource, a decoding consumption time for the image resource, and a memory usage for the image resource.

6. The method of claim 1, further comprising:
determining, by the at least one processor, whether the image resource is a predefined compressed texture format; and
if the image resource is the predefined compressed texture format, converting, by the at least one processor, the image resource into the compressed texture.

7. The method of claim 1, further comprising:
determining, by the at least one processor, parallelization execution information based on at least one of a current consumption of the electronic device, a heat emission thereof, a characteristic of a graphic processor, and a format of the image resource; and
converting, by the at least one processor, the image resource into the compressed texture based on the determined parallelization execution information.

8. An electronic device comprising:
a memory; and
at least one processor coupled to the memory,
wherein the at least one processor is configured to:
determine whether the electronic device operates in a sleep mode;
in response to the determining that the electronic device operates in the sleep mode, identify an image resource with a first format for an application based on receiving a request for installing the application;
convert the image resource into a compressed texture;
determine whether to use the compressed texture to create a binary code for the application based on a quality of the compressed texture;
in response to determining to use the compressed texture, repackage an installation package for the application to include the compressed texture such that the application is installed based on the installation package repackaged to include the compressed texture; and
in response to determining not to use the compressed texture, convert a format of the image resource from the first format to a second format and repackage an installation package for the application to include the image resource with the second format such that the application is installed based on the installation package repackaged to include the image resource with the second format.

9. The electronic device of claim 8, wherein the at least one processor is configured to convert the image resource into the compressed texture, based on a setting of the electronic device.

10. The electronic device of claim 8, wherein the at least one processor is further configured to determine whether to use the compressed texture to create the binary code for the application, based on a comparison result between a memory usage when creating the binary code for the application by using the compressed texture and a memory usage when creating a binary code for the application based on the image resource.

11. The electronic device of claim 8, wherein the at least one processor is further configured to determine whether to use the compressed texture to create the binary code for the application, based on a comparison result between an application driving consumption time when creating the binary code for the application by using the compressed texture and an application driving consumption time when creating a binary code for the application based on the image resource.

12. The electronic device of claim 8, wherein, in response to determining not to use the compressed texture, the at least one processor is further configured to convert the format of the image resource such that the quality of the image resource is substantially maintained based on at least one of an encoding consumption time for the image resource, a decoding consumption time for the image resource, and a memory use for the image resource.

13. The electronic device of claim 8, wherein the at least one processor is further configured to:
determine whether the image resource is a predefined compressed texture format, and
if the image resource is the predefined compressed texture format, convert the image resource into the compressed texture.

14. The electronic device of claim 8, wherein the at least one processor is further configured to:
determine parallelization execution information based on at least one of a current consumption of the electronic device, a heat emission thereof, a characteristic of a graphic processor, and a format of the image resource, and
convert the image resource into the compressed texture, based on the determined parallelization execution information.

15. A non-transitory computer-readable recording medium storing instructions in an electronic device, the non-transitory computer-readable recording medium recording a program for executing operations of:
determining whether the electronic device operates in a sleep mode;
in response to determining that the electronic device operates on the sleep mode, identifying an image resource with a first format for an application stored in a memory of the electronic device based on receiving a request for installing the application;
converting the image resource into a compressed texture;
determining whether to use the compressed texture to create the binary code for the application based on a quality of the compressed texture;
in response to determining to use the compressed texture, repackaging an installation package for the application to include the compressed texture such that the application is installed based on the installation package repackaged to include the compressed texture; and
in response to determining not to use the compressed texture, converting a format of the image resource from the first format to a second format and repackaging an installation package for the application to include the image resource with the second format such that the application is installed using the installation package repackaged to include the image resource with the second format.

16. The non-transitory computer readable recording medium of claim 15, further comprising converting the image resource into the compressed texture based on a setting of an external electronic device capable of communicating with the electronic device.

17. The non-transitory computer readable recording medium of claim 15, further comprising determining whether to use the compressed texture to create the binary code for the application based on at least one of an encoding consumption time for the image resource, a decoding consumption time for the image resource, and a memory usage for the image resource.

18. The non-transitory computer readable recording medium of claim 15, further comprising:
determining whether the image resource is a predefined compressed texture format; and if the image resource is the predefined compressed texture format, converting the image resource into the compressed texture.

\* \* \* \* \*